(12) United States Patent
Trainin

(10) Patent No.: US 9,288,757 B2
(45) Date of Patent: Mar. 15, 2016

(54) TECHNIQUES FOR CONSERVING POWER FOR COMMUNICATION BETWEEN WIRELESS DEVICES

(71) Applicant: Solomon Trainin, Haifa (IL)

(72) Inventor: Solomon Trainin, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 76 days.

(21) Appl. No.: 14/323,213

(22) Filed: Jul. 3, 2014

(65) Prior Publication Data

US 2016/0007283 A1 Jan. 7, 2016

(51) Int. Cl.
*H04W 52/02* (2009.01)
*G06F 1/32* (2006.01)
*H04W 28/02* (2009.01)

(52) U.S. Cl.
CPC ......... *H04W 52/0216* (2013.01); *G06F 1/3262* (2013.01); *G06F 1/3293* (2013.01); *H04W 28/0221* (2013.01); *H04W 52/0235* (2013.01)

(58) Field of Classification Search
None
See application file for complete search history.

(56) References Cited

U.S. PATENT DOCUMENTS

| | | | | |
|---|---|---|---|---|
| 2010/0135268 A1* | 6/2010 | Seok | ............... | H04W 74/0816 370/338 |
| 2011/0222408 A1* | 9/2011 | Kasslin | ............... | H04L 41/083 370/241 |
| 2012/0045005 A1* | 2/2012 | Kim | ............... | H04W 52/0216 375/260 |
| 2012/0224521 A1* | 9/2012 | Zhu | ............... | H04W 52/0212 370/311 |
| 2013/0142099 A1* | 6/2013 | Shirakata | ............ | H04W 52/028 370/311 |
| 2013/0223419 A1* | 8/2013 | Ghosh | ............... | H04W 52/0235 370/338 |
| 2014/0016567 A1* | 1/2014 | Lu | ............... | H04W 72/12 370/329 |
| 2015/0063251 A1* | 3/2015 | Asterjadhi | ............ | H04W 74/04 370/329 |

* cited by examiner

*Primary Examiner* — Brian Roberts
(74) *Attorney, Agent, or Firm* — Sutherland Asbill & Brennan LLP

(57) ABSTRACT

Embodiments herein relate to various techniques for conserving power for communication between wireless devices. Example techniques described herein may achieve power conservation by synchronizing when devices in communication with one another may enter power save or sleep mode and subsequently when the devices may wake up from power save mode to resume communication. According to one technique, a sending device may establish a rendezvous time in a duration field of a control frame (e.g., an RTS frame), which may indicate a time at which the devices may awake from power save mode. According to another technique, a duration may be indicated in a duration field of one or more data frames, and a rendezvous offset may be indicated in a Quality of Service (QoS) control field of the one or more data frames. Such a duration and rendezvous offset may be used to establish a rendezvous time in this technique.

35 Claims, 6 Drawing Sheets

TECHNIQUES FOR CONSERVING POWER FOR COMMUNICATION BETWEEN WIRELESS DEVICES

BACKGROUND

Power consumption by battery-powered wireless devices occurs during establishment of a connection and communication by such devices, among other functions. Conserving power is becoming increasingly more important as the availability of wireless devices is becoming more critical. Devices that employ existing techniques, such as Carrier Sense Multiple Access/Collision Avoidance (CSMA/CA), however, may remain in receive mode, and hence may continue to consume power, even when data transmissions are not being received or expected. Further, other techniques that may schedule communications between devices, such as Hybrid Coordination Function (HCF) Controlled Channel Access (HCCA), may not be suitable for Enhanced Distributed Channel Access (EDCA), which may rely on CSMA/CA. Existing techniques therefore may struggle to leverage the benefits of CSMA/CA while conserving power during wireless communication by wireless devices, and therefore, fail to address the declining availability of wireless devices.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
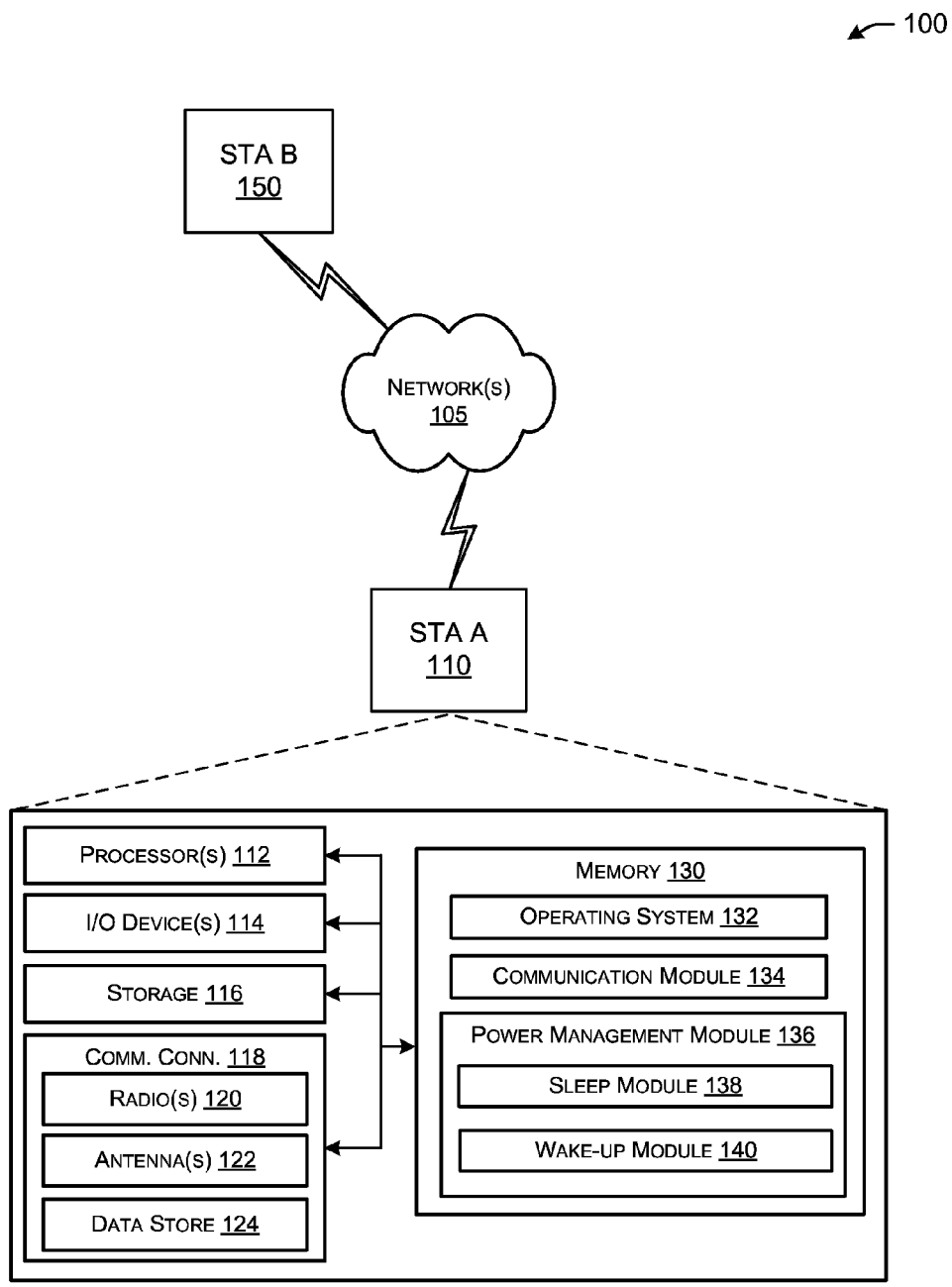
FIG. 1 illustrates a block diagram of an example computing environment for implementing techniques to conserve power for communication between wireless devices, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, various techniques for conserving power for communication between wireless devices. Example techniques described herein may achieve power conservation by synchronizing when devices in communication with one another may enter power save or sleep mode and subsequently when the devices may wake up from power save mode to resume communication. The devices may consume substantially less power in power save mode than in a mode, such as active mode, in which the device may send control frames and data frames, as well as listen for such frames from other devices.

According to one power conservation technique, a sending device may establish a rendezvous time at which the sending device and a device that receives transmissions from the sending device (the receiving device) wake up from power save mode. In one embodiment, the rendezvous time may be indicated in a duration field associated with a request to send (RTS) frame, or a duration field associated other types of frames (e.g., control frames, management frames, data frames, Quality of Service (QoS) data frames, etc.), sent from the sending device to the receiving device during a transmit opportunity (TXOP) between the two devices. In another embodiment, the rendezvous time at which the devices may wake up from power save mode may be determined based on a duration indicated in the duration field of a QoS data frame and a rendezvous offset, which may be indicated in the Quality of Service (QoS) control field of the QoS data frame sent from the sending device to the receiving device.

Certain embodiments herein also relate to determining whether devices are capable of using rendezvous synchronization, or put another way, waking up when a rendezvous time is reached. In one embodiment, such a determination may be made by accessing a bit in the capabilities field of the extended capabilities element of the 802.11 wireless standard to determine whether it indicates support for rendezvous synchronization. Such capabilities of devices may be exchanged during an association process in which the devices may negotiate communication with one another. For example, a first device may send its capabilities information (e.g., whether the first device supports rendezvous synchronization) in an association request to a second device, which may in turn send its capabilities information (e.g., whether the second device supports rendezvous synchronization) to the first device in an association response. If it is determined that both the sending device and the receiving device support rendezvous synchronization, then both devices may conserve power as described herein.

According to one example, the sending device may send an RTS frame to the receiving device indicating a duration corresponding to a rendezvous time. The sending device may send a CTS frame to the sending device, at which time a transmit opportunity (TXOP) between the sending device and the receiving device may be established. Upon establishing the transmit opportunity (TXOP), the sending device may send one or more data frames to the receiving device. The sending device may thereafter send a contention-free (CF)-end frame to the receiving device to terminate the transmit opportunity (TXOP), at which time the sending device and the receiving device may enter power save mode until the rendezvous time is reached. According to other examples, the sending device may send a QoS data frame that includes a duration indicated in the duration field of the QoS data frame and a rendezvous offset indicated in the Quality of Service (QoS) control field of the QoS data frame.

According to another power conservation technique, a receiving device may cause a sending device to transmit (or stop transmitting) data frames based on the receiving device's desire to receive data. For example, the receiving device may set the RBUFCAP cap field, which may be defined in conjunction with Directional Multi-Gigabit (DMG) block ACK (BACK) with flow control frame, may be set to indicate to the sending device whether to send (or not send) data frames. After receiving an indication to stop transmitting data frames, the sending device may enter low power receive mode, and may conversely enter full power receive mode after receiving an indication to begin or resume transmitting data frames.

The above descriptions are for purposes of illustration and are not meant to be limiting. Numerous other configurations, examples, descriptions, etc., may exist, some of which are described in greater detail below.

FIG. 1 depicts a block diagram of an example computing environment 100 for implementing techniques to conserve power for communication between wireless devices, according to an embodiment of the disclosure. The example computing environment 100 may include, but is not limited to, one or more stations 110 and 150, which may communicate with one another over one or more networks 105 to facilitate the processes described herein. For example, the station 110 may establish a transmit opportunity with the station 150 using the EDCA channel access method, and may subsequently exchange data and/or control information with the station 150. In conjunction with such exchanges, the stations 110 and 150 may establish a time at which the devices will awake from sleep mode to resume communication (referred to herein as a rendezvous time), as will be described in greater detail below. For ease of illustration, two stations 110 and 150 are shown. One of the stations (e.g., the station 110) may act as a transmission device while the other station (e.g., the station 150) may act as a receiver device, though either device may perform one or both of transmitting and receiving information. Many more stations, at least some of which may perform the same or similar functions as the stations 110 and 150, may exist on the one or more networks 105 in other examples.

As used herein, a station may include one or more devices that may implement various functions of the station. In this way, a station may also be referred to herein as a device. As used herein, a "device" may refer to any computing component that includes one or more processors that can be configured to execute computer-readable, computer-implemented, or computer-executable instructions. Example devices can include wireless stations, personal computers, server computers, server farms, digital assistants, smart phones, personal digital assistants, digital tablets, smart cards, wearable computing devices, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate the processes described herein.

As used herein, a "rendezvous time," or similar, may refer to a time at which a device may awake from power save mode. The rendezvous time may be an expected duration for communication between stations, in one embodiment. Such an expected duration may be the same or approximately the same as a transmit opportunity (TXOP), in one example. Other time-based indications that may trigger a device to awake, enter a different mode of operation, return to a previous mode of operation, or otherwise return to active mode, may be used in other embodiments. After a device returns to active mode, the device may start a new or next transaction with another device, such as with a device with which it was previously communicating or a new device. In this way, the rendezvous time may indicate a time or approximate time at which a device is expected to begin its next transaction.

Various types of networks 105 may facilitate communication between the devices shown in FIG. 1. Such networks may include any number of wireless or wired networks that may enable various computing devices in the example computing environment 100 to communicate with one another. In some embodiments, other networks, intranets, or combinations of different types of networks may be used including, but not limited to, WiFi networks, WiFi Direct networks, NFC networks, Bluetooth® networks, cellular networks, radio networks, satellite networks, other short-range, mid-range, or long-range wireless networks, the Internet, intranets, cable networks, landline-based networks, or other communication mediums connecting multiple computing devices to one another. In some embodiments, communication between wireless stations 110 and 150 may include one or more access points, which may route information between the stations 110 and 150.

The stations 110 and 150 may include a radio receiver. A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. The stations 110 and 150 may further include a radio transmitter that may send one or more RF signals to other devices, including access points (not shown), which may route information between the stations 110 and 150, among other things. In some configurations, the stations 110 and 150 may include a radio transceiver that may receive and send RF signals. A transceiver (or the receiver and/or the transmitter) may be coupled to one or more antennas (e.g., the antennas 122 associated with the station 110). In certain embodiments herein, such a wireless system may include the hardware and software to broadcast and receive messages either using the Wi-Fi Direct Standard (e.g., Wi-Fi Direct specification published in Oct. 2010) and or the IEEE 802.11 wireless standard (e.g., IEEE 802.11-2007, published Mar. 8, 2007; IEEE 802.11n-2009, published Oct. 2009; IEEE 802.11ad, published Dec. 2012; IEEE 802.11ac, published December 2013) or a combination thereof.

Turning now to the contents of the stations 110 and 150, the stations 110 and 150 may include various hardware and software elements to implement or facilitate the processes described herein. Although such elements are only shown for the station 110, all or at least a portion of the elements may exist for the station 150, in various embodiments.

The station 110 may include one or more processors configured to communicate with one or more memory devices and various other components or devices. For example, the station 110 may include one or more processors 112, one or more input/output (I/O) devices 114, storage 116, one or more communication connections 118, and one or more data stores 124. The one or more processors 112 may be implemented as appropriate in hardware, software, firmware, or a combination thereof.

The memory 130 may store program instructions that are loadable and executable on the processor 112, as well as data generated during the execution of these programs. Depending on the configuration and type of the station 110, the memory 130 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc.

The storage 116 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing system.

The memory 130 and the storage 116, both removable and non-removable, are examples of computer-readable storage media. For example, computer-readable storage media may include volatile and non-volatile, removable and non-removable media implemented in any method or technology for storage of information such as computer-readable instructions, data structures, program modules, or other data.

The I/O devices 114 may enable a user to interact with the station 110 to perform various functions. The I/O devices 114 may include, but are not limited to, a keyboard, a mouse, a pen, a voice input device, a touch input device, a gesture detection or capture device, a display, a camera or an imaging device, speakers, and/or a printer.

The communication connections 118 may allow the user device 210 to communicate with other devices, such as the station 150, over the one or more wireless networks 105. The communication connections 118 may include one or more radios 120 and one or more antennas 122, which may include hardware and software for sending and/or receiving wireless signals over the various types of networks 105 described above.

The one or more data stores 124 may store lists, arrays, databases, flat files, etc. In some implementations, the data store 124 may be stored in a memory external to the station 110 but may be accessible via one or more networks, such as with a cloud storage service. The data store 124 may store information that may facilitate techniques for conserving power for communication between wireless devices, as described herein. Such information may include, but is not limited to, a rendezvous time at which the station 110 is scheduled to awake from power save mode, which may include a rendezvous offset, and a delay time associated with establishing a transmit opportunity (TXOP), and Network Allocation Vector (NAV) values including an amount of time a station having the NAV delays or defers from accessing a communication medium for which a transmit opportunity (TXOP) is sought. Such information may be accessed by the data store 124 to implement or facilitate the processes described herein.

Turning to the contents of the memory 130, the memory 130 may include, but is not limited to, an operating system (O/S) 132, a communication module 134, and a power management module 136. Each of the modules 132, 134, and 136 may be implemented as individual modules that provide specific functionality associated with various techniques for conserving power for communication between wireless devices. Alternatively, one or more of the modules 132, 134, and 136 may perform all or at least some of the functionality associated with the other modules.

The operating system 132 may refer to a collection of software that manages computer hardware resources and provides common services for computer programs to enable and facilitate the operation of such programs. Example operating systems may include UNIX, Microsoft Windows, Apple OS X, etc.

The communication module 134 may configure the station 110 to communicate with other devices, such as the station 150. For example, the communication module 134 may identify devices on the network 105 that are capable of establishing a rendezvous time with the station 110. In so doing, the communication module 134 may send an association request that includes capabilities information, such as that which may exist in the capabilities field of the extended capabilities element of the 802.11 wireless standard. In certain embodiments, herein at least one bit in the capabilities element may be modified to signal whether stations (e.g., the stations 110 or 150) support rendezvous synchronization, in which the stations may establish a rendezvous time at which the stations may wake up to begin or resume communication with one another, as described herein. According to one example, the stations 110 or 150 may set the capabilities field to one (1) to indicate that the station supports rendezvous synchronization, while the station 110 or 150 may set the capabilities field to zero (0) to indicate that the station does not support rendezvous synchronization.

The communications module 134 may also establish association between devices. The association request and association response may indicate, among other information, that the devices (e.g., the station 150 and the station 110) are capable of using a rendezvous time at which the device may awake from power save mode in similar fashion to that described above.

The communication module 134 may also establish a transmit opportunity (TXOP) consistent with the EDCA channel access method, in one embodiment. In one embodiment, the communication module 134 may send a Request to Send (RTS) frame to the station 150 or other devices. The communication module 134 may also receive a Clear to Send (CTS) frame, which may signify that the transmit opportunity (TXOP) has been established, in response to sending the RTS frame.

The communication module 134 may further send data frames to the station 150 and/or other devices. Such data frames may include Aggregate MAC Protocol Data Units (A-MPDU), Aggregate MAC Service Data Unit (A-MSDU) enveloped in Directional Multi-Gigabit (DMG) physical layer (PHY) protocol data units (PDU) or PPDUs, or other types of data frames that may carry data, text, voice, multimedia, or various other types of content or information. The communication module 134 may further send a CF-end packet, for example, to truncate a duration established by the station 110 for transmitting data to the station 150 or other devices. In some embodiments, the communication module 150 may also receive a CF-end packet in response to transmitting a CF-end packet to the station 150 or other device.

While example descriptions above may relate to the station 110 sending or receiving certain packets or information, the station 110 may also receive information that is described as being sent and/or send information that is described as being received. Put another way, the station 150 may perform the same or similar functions as the station 110, whether the station 110 acts as a device receiving data transmissions from the station 150 or sending such transmissions.

The communication module 134 may implement various wireless communications protocols, such as WiFi, WiFi Direct, etc. The communications module 134 may also include various modulation techniques for modulating signals. Such signals may include information in frames distributed over the one or more networks 105, such as Orthogonal Frequency Division Multiplexing (OFDM), dense wave division multiplexing (DWDM), phase-shift keying (PSK), frequency-shift keying (FSK), amplitude-shift keying (ASK), and quadrature amplitude modulation (QAM), single carrier (SC) modulation among other techniques. Each of the devices shown in FIG. 1 may utilize such modulation techniques (e.g., via a modulator), as well as demodulation techniques (e.g., via a demodulator) to access information from a modulated signal.

The power management module 136 may implement processes to manage power consumption by a wireless device, such as the station 110. Such power consumption management may include conserving power during communications between devices, in one embodiment. In so doing, the power management module 136 may modify the duration field of 802.11 frames frame to include a rendezvous time at which the devices may awake from power save mode, in one embodiment. The power management module 136 of a data transmission device, such as the station 110 in one example, may store the rendezvous time, for example, in a memory or data store, where it may be accessed and used to awake the data transmission device from power save mode or sleep mode. A device that receives the frames indicating the rendezvous time in the duration field of an 802.11 frame (e.g., the station 150) may also store the rendezvous time, and may access the stored rendezvous time to determine a time at which to awake from power save mode.

In some embodiments, the power management module 136 may modify the Quality of Service (QoS) control field associated with a data frame to include a rendezvous offset. The existing QoS control field may be modified to include information that may indicate a rendezvous offset, in one embodiment. According to one configuration, bits 10-14 of the QoS control field may be modified to include the rendezvous offset. Other bits may be modified to include the rendezvous offset in other configurations. The rendezvous offset may be used to compute a rendezvous time offset. In one embodiment, the rendezvous time offset may be the result of multiplying the rendezvous offset by a constant. In one embodiment the constant is delivered in information element conveyed by the association response frame. The rendezvous time offset may be added to the duration field to establish a rendezvous time, in one embodiment.

The power management module 136 may include a sleep module 138 and a wake-up module 140, among other modules. The sleep module 138 may cause the station 110 to enter power save mode, which may mean that the station 110 dozes, powers down, or turns off at least a portion of its functionality or capabilities, such as its receive capability, transmission capability, processing capability, etc., in a manner that allows the station 110 to conserve power, not consume power, or at least consume a smaller amount of power than when the station 110 is in an active state (e.g., not powered down). The station 110 may maintain, when in power save mode, an amount of power sufficient to allow the station 110 to determine when the rendezvous time has arrived and subsequently wake up the station 110, as described in greater detail below.

In one embodiment, the station 110 may enter power save mode after sending a CF-end packet. In other embodiments, the station 110 may enter power save mode after receiving a CF-end packet from the station 150. The station 150 may also enter power save mode as a result of receiving the CF-end packet from the station 110.

The wake-up module 140 may wake the station 110 up from power save mode. In one embodiment, the wake-up module 140 may return the station 110 to its original state (e.g., active mode) before the station 110 entered power save mode. Returning to such a state may restore the full functions or capabilities of the station 110, in one embodiment. In another embodiment, the wake-up module 140 may turn on at least one function that was disabled or turned off in the power save mode. In one example, the station 110 may resume communication with the station 150 after waking up. For example, the station 110 may receive an RTS frame from the station 150 and send a CTS packet to confirm establishment of a transmit opportunity (TXOP) between the stations 110 and 150, and may subsequently begin receiving and/or transmitting data.

In certain embodiments herein, the wake-up module 140 may wake up the station 110 from power save mode when the rendezvous time is reached. In so doing, the wake-up module 140 may restore or turn on all or at least a portion of the features or capabilities associated with the station 110, return the station 110 to its previous operating state (e.g., before the station 110 entered power save mode), or otherwise return the station 110 to active mode.

The above descriptions in FIG. 1 are for purposes of illustration and are not meant to be limiting. Other descriptions, configurations, examples, etc., exist. For example, all or at least a portion of the functionality described for the station 110 may be performed by the station 150, and vice versa.

Figure 2:
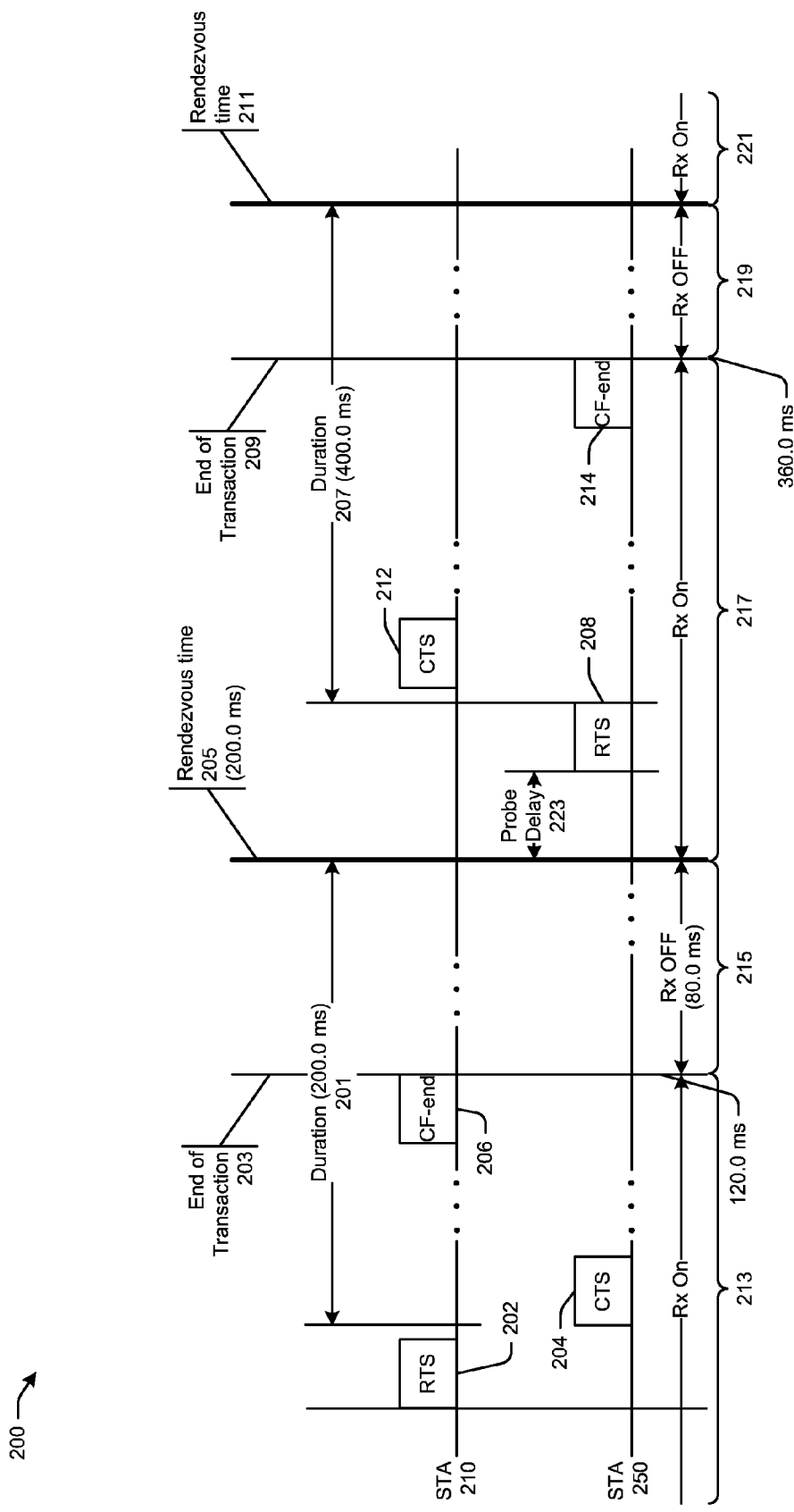
FIG. 2 illustrates a timeline of an example technique for conserving power using a rendezvous time associated with a duration field, according to an embodiment of the disclosure.

FIG. 2 depicts a timeline of an example technique 200 for conserving power using a rendezvous time associated with a duration field, according to an embodiment of the disclosure. As shown in FIG. 2, a station 210 may communicate with a station 250. The stations 210 and 250 may be embodied by the stations 110 and 150, respectively, in one embodiment. In certain embodiments herein, the communication between the station 210 and the station 250 may occur using the EDCA channel access method. For example, station 210 may establish a transmit opportunity (TXOP) by sending an RTS frame 202 to the station 250. In response to transmitting the RTS frame 202, the station 210 may receive a CTS frame 204, which may indicate that the transmit opportunity (TXOP) has been established.

Prior to sending the RTS frame 202, the station 210 may modify the duration field in or associated with the RTS frame 202 to include a duration or time at which the station 210 is expected to awake and begin a next transaction with the station 250 (e.g., a rendezvous time), in one embodiment. Such a time may correspond to the duration 201, which may correspond to the rendezvous time 205, both shown in FIG. 2. Put another way, the rendezvous time may be the expected duration of a transmit opportunity (TXOP) established for data communication between the station 210 and the station 250.

In certain embodiments herein, the rendezvous time may be established using any frame that includes a duration field. Such a duration field may point to or otherwise include the end (or the remainder) of the transmission opportunity (TXOP). The transmit opportunity (TXOP) may point to, include, or otherwise be the expected rendezvous time, which may represent a point in time. According to one configuration, the rendezvous time may be delivered (e.g., from the station 210 to the station 250) if at least one frame is successfully delivered to the destination station (e.g., the station 250).

The station 210 may store the rendezvous time (e.g., in a memory, data store, or other storage mechanism), and may access the stored rendezvous time (e.g., continuously, periodically, etc.) to determine when the rendezvous time has been reached to facilitate waking the station 210 when the rendezvous time has been reached. The station 250 may perform the same or similar functions to determine when the rendezvous time has been reached and wake up at such time.

The station 210 may send one or more data frames (not shown) to the station 250 after the transmit opportunity has been established. The data frame transmission may continue until the duration 201 has been reached. In certain embodiments herein, a CF-end frame 206 may be sent to reduce or terminate the communication transaction, as shown by the end of transaction 203. After transmitting the CF-end frame 206, the station 210 may power down or enter sleep mode or power save mode, in one embodiment. The station 250 may also power down or enter power save mode upon receiving the CF-end frame 206. In another embodiment, the station 250 may send a return CF-end frame (not shown) and may enter power save mode after so doing, and the station 210 may enter power save mode upon receiving such a CF-end frame 206. Such power save modes may be represented by the receive (Rx) OFF indication 215, which may indicate that the stations' 210 and 250 receive capability is no longer operable. As described above, entering power save mode may mean that all or at least a portion of the station's 210 and 250 functionality may be turned off or disabled as a result of entering power save mode. Thus, more than receive mode may be turned off or inoperable as indicated by the receive OFF indication 215.

Prior to entering the time period represented by the receive OFF indication 215, the stations 210 and 250 may operate in a receive (Rx) ON mode 213, which may mean that at least the receive functions of the stations 210 and 250 are operable. The receive mode 213 may also mean generally that the stations 210 and 250 are active (e.g., not in power save mode), and therefore, may perform all or at least a portion of its capabilities. The stations 210 and 250 may wake up at the time period indicated by the receive ON indication 217, as shown.

For purposes of illustration, the station 210 may establish a duration 201 of 200.0 milliseconds (ms) for communicating with the station 250. The station 210 may terminate such a duration by sending the CF-end frame 206 at 120.0 ms. According to this example, the station 210 (and the station 250) may remain in power save mode for 80.0 ms (200.0 ms-120.0 ms) and awake at the 200.0 ms rendezvous time, as shown in FIG. 2.

Upon the stations 210 and 250 waking up, the stations 210 and 250 may establish a transmit opportunity (TXOP). Establishment of the transmit opportunity (TXOP) upon waking up may be the same or at least similar to establishing the transmit opportunity (TXOP) prior to the stations 210 and 250 entering power save mode, in one embodiment. In another embodiment, the station 250 may send an RTS frame 208 to the station 210, as shown. Prior to sending the RTS frame 208, the station 250 may modify a duration in the duration field associated with the RTS frame 208 to include a rendezvous time at which the station 250 (and the station 210) may awake from power save mode. Such a time may be referred to as the duration 207 and the rendezvous time 211.

In some embodiments, the station 210 may analyze the rendezvous time indicated in the RTS frame (or other type of frame including a duration field) received from the station 250. In so doing, the station 210 may reject the rendezvous time, and therefore, may not wake up at the rendezvous time. The station 210 may, instead of responding with the CTS frame 212, send an RTS frame (not shown) that may indicate a rendezvous time determined by the station 210. The station 250 may thereafter analyze the rendezvous time received from the station 210 and accept or reject the rendezvous time. In this way, the stations 210 and 250 may exchange control frames until the devices establish a rendezvous time at which they will both wake up from power save mode.

The station 250 may send a CF-end frame 214 to terminate data communication with the station 210 before the duration 207 is reached. After sending the CF-end frame 214, the station 210 may enter power save mode. The station 250 may also enter power save mode after receiving the CF-end frame 214, in one embodiment. Entering the power save mode by the stations 210 and 250 may be represented by the receive (Rx) OFF indication 219, whereas communication between the stations 210 and 250 before they entered power save mode may be represented by the receive ON indication 217. When the stations 210 and 250 reach the rendezvous time 211, the stations 210 and 250 may wake up, as shown by the receive (Rx) ON indication 221, and start a new or next communication with each other.

For purposes of illustration, the station 250 may establish a duration 207 of 400.0 milliseconds (ms) for communicating with the station 210. The station 250 may terminate such a duration by sending the CF-end frame 206 at 360.0 ms. According to this example, the station 250 (and the station 210) may remain in power save mode for 40.0 ms (400.0 ms-360.0 ms) and awake at the 400.0 ms rendezvous time, as shown in FIG. 2.

A probe delay 223 may exist before the RTS frame 208 is sent, in one embodiment. The probe delay 223 may also exist before the RTS frame 202 is sent. The probe delay 223 may provide the stations 210 and 250 with sufficient time to listen to avoid interference with messages from other stations before the stations 210 and 250 begin communicating with each other.

As described above, the stations 210 and 250 may exchange information about their capabilities, such as whether they support rendezvous synchronization or functionality associated with waking up from power save mode at a certain time (e.g., as indicated in a duration field of a control frame or in a QoS control field of QoS data frames). Such a determination may be performed during the association process between the devices. For example, upon receiving an association request from the station 250 that includes an indication of whether the station 250 supports rendezvous synchronization, the station 210 may send an association response that may indicate whether the station 210 supports rendezvous synchronization. According to one configuration, a signaling bit having a value of one (1) in the capabilities field of the extended capabilities element of the 802.11 wireless standard may indicate that the station 210 (or the station 250) supports rendezvous synchronization, whereas a signaling bit having a value of zero (0) may indicate that the station 210 (or the station 250) does not support rendezvous synchronization.

The descriptions in FIG. 2 are for purposes of illustration and are not meant to be limiting. Other descriptions, configurations, functions, etc., may also exist. For example, the number of transmission opportunities (TXOPs) established by the stations 210 and 250 may vary, as well as the number of control frame transmissions used to establish the transmission opportunities (TXOPs). For example, any number of transmissions and/or retransmissions of control frames for establishing communication using the EDCA channel access method (or other channel access methods), and/or transmissions and/or retransmissions of data frames, may exist. Further, control frames other than an RTS or CTS may be used to indicate a rendezvous time, or other information, in other embodiments.

Figure 3:
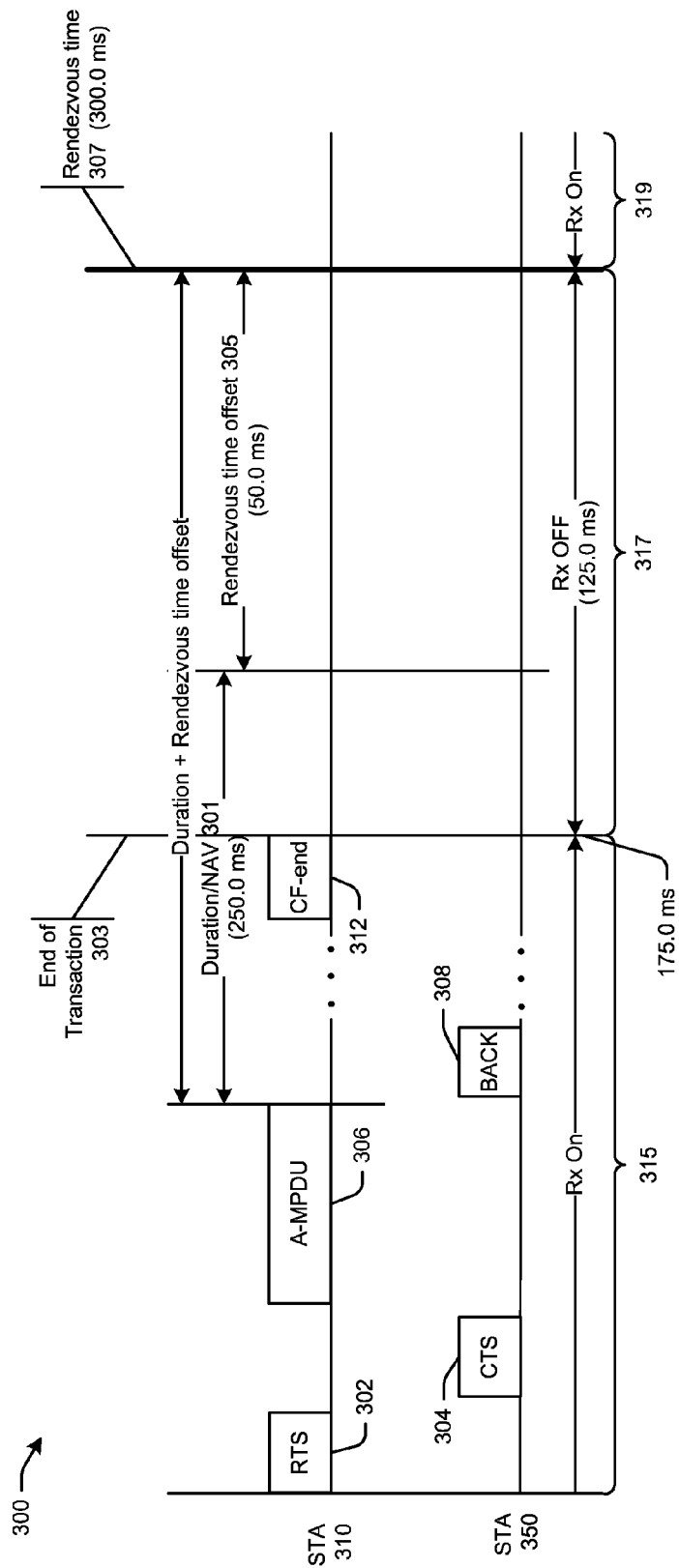
FIG. 3 illustrates a block diagram of an example technique for conserving power using a rendezvous time offset in conjunction with a duration field, according to an embodiment of the disclosure.

FIG. 3 depicts a timeline of an example technique 300 for conserving power using a rendezvous time offset in conjunction with a duration field, according to an embodiment of the disclosure. The example technique 300 may include transmissions that are the same or similar to those described above for the example technique 200. For example, the stations 310 and 350 may determine whether the other station supports rendezvous synchronization by, for example, exchanging an association request and an association response that may signal such information in the capabilities field of the extended capabilities element of the 802.11 wireless standard.

The stations 310 and 350 may also establish a transmit opportunity (TXOP) for communicating with one another using EDCA channel access. For example, the station 310 may send an RTS frame 302 to the station 350 that includes a duration 301 of the transmit opportunity. The value in the duration field 301 may be used to establish the rendezvous time offset, as described herein.

The station 350 may send a CTS frame 304 to the station 310 to confirm or indicate that the transmit opportunity (TXOP) has been established. A duration field associated with the CTS frame 304 may refer to the duration value received from the station 310 in the RTS frame 302.

The station 310 may send one or more data frames A-MPDU 306 to the station 350 and may receive a block acknowledgement (BACK) 308 in response. In certain embodiments herein, data frames, such as the A-MPDU frame 306 or other types of data frames, may indicate a rendezvous time offset 305 that may be added to the duration value 301 delivered in the frames to establish a rendezvous time 307 at which the stations 310 and 350 may wake up from power save mode. In one embodiment, the QoS control field associated with the QoS data frames may indicate a rendezvous offset. In one configuration, bits 10-14 of the QoS control field may include the rendezvous offset, though other bits, or number of bits, may be used in other configurations.

In one embodiment, the rendezvous time offset 305 may be determined based on the duration value delivered in the frames aggregated in A-MPDU by the station 310, which may represent the amount of time left in the TxOP for communication between the station 310 and the station 350. For example, if the station 310 delivers 250.0 ms in the duration field of the frames in the A-MPDU 306 that is the remainder of the established TxOP and the value of the rendezvous time offset 305 is 50.0 ms, then the rendezvous time 307 becomes 300.0 ms, in the present example. The rendezvous time offset 305 may be based on other considerations or may include other values in other examples.

In one embodiment, value of the rendezvous time offset 305 may be calculated as content of rendezvous offset included in the QoS control field multiplied by the constant. In one example, the constant may be 100.0 microseconds such that the rendezvous time offset 305 may be distanced or separated from the duration 301 in the range of 0.0 ms to 3.1 ms. Numerous other constants may be used in other examples. The constant may be defined in the 802.11 standard as a parameter or may be advertised by a personal basic service set coordination point (PCP) station (e.g., the station 310 in one example) as an MIB variable, among other techniques.

As shown in FIG. 3, the station 310 may send a CF-end frame 312 to the station 350 to terminate the transmit opportunity (TXOP) duration 301, such termination represented by the end of transaction 303. In association with transmitting the CF-end frame 312, the station 310 may enter power save mode, and the station 350 may enter power save mode in association with receiving the CF-end frame 312, in one embodiment. The stations 310 and 350 may therefore leave the receive (Rx) ON mode 315 and enter the receive (Rx) OFF mode 317 until the rendezvous time is reached (as indicated by the receive ON mode 317), at which time the stations 310 and 350 may awake from power save mode. As described, waking up from power save mode may mean that all or at least a portion of the capabilities of the stations 310 and 250 (e.g., the receive capability) may become available after not being available during power save or sleep mode (e.g., receive (Rx) OFF indication 317). Upon waking up, the stations 310 and 350 may establish another transmit opportunity (TXOP) and begin a next transaction the same or similar to that described above.

For purposes of illustration in the present example, the CF-end frame 312 is transmitted at 175.0 ms (as shown), at which time the stations 310 and 350 may enter power save mode as described. The stations 310 and 350 may remain in power save mode for 125.0 ms (as shown), which may be the difference between the rendezvous time 307 of 300.0 ms (e.g., which may be established by adding the duration 301 of 250.0 ms to the rendezvous time offset 305 of 50.0 ms) and the point at which the CF-end frame 312 was received (e.g., 300.0 ms-175.0 ms=125.0 ms).

In one embodiment, the duration 301 may be established such that it is longer than expected to complete a data transaction between the stations 310 and 350. The difference between the increased duration time 301 and the point at which the CF-end frame 312 is sent plus the rendezvous time offset may represent the amount of time that the stations 310 and 350 remain in power save mode. Establishing the duration 301 in such a manner may therefore influence the amount of time that the stations 310 or 350 remain in power save mode.

The above descriptions in FIG. 3 are for purposes of illustration and are not meant to be limiting. Numerous other descriptions, configurations, examples, etc., may also exist. For example, data frames other than A-MPDUs or other types of data frames used herein, may be used to indicate a rendezvous time, a rendezvous time offset, or various other information that may be used to facilitate the processes described herein.

Figure 4:
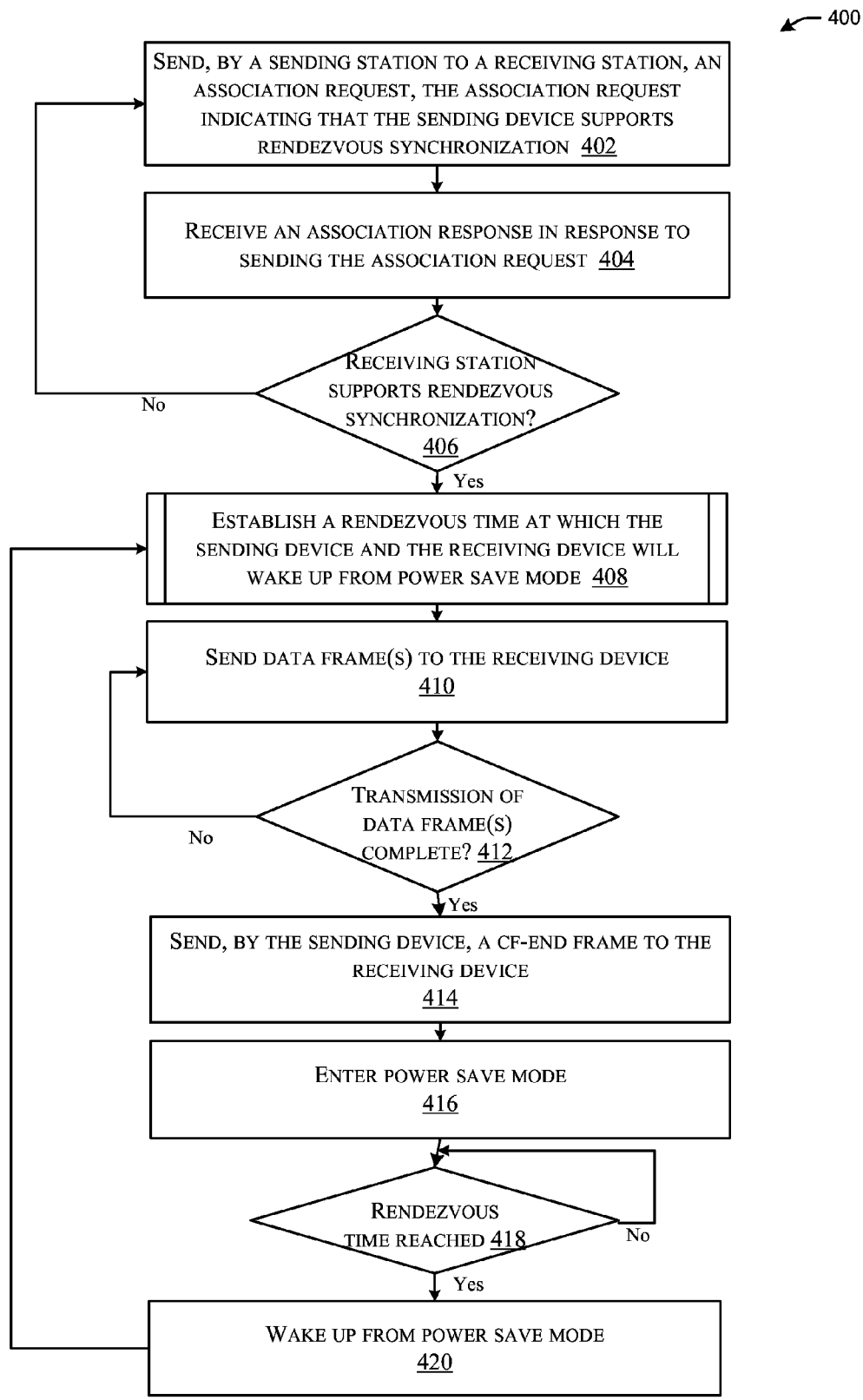
FIG. 4 illustrates a flow diagram of an example process for implementing techniques to conserve power for communication between wireless devices, according to an embodiment of the disclosure.

FIG. 4 depicts a flow diagram of an example process 400 for implementing techniques to conserve power for communication between wireless devices, according to an embodiment of the disclosure. The example process 400 may be performed by the station 110 or the station 150 in FIG. 1. The example process 400 may begin at block 402, where a station may send an association request (e.g., by the communication module 134) to a receiving station to determine whether the receiving device supports rendezvous synchronization. The association request may indicate that the sending device supports rendezvous synchronization and may request whether the receiving station supports rendezvous synchronization. An association response from the station to which the association request was sent may be received (e.g., by the communication module 134) at block 404.

If the association response indicates that the station supports rendezvous synchronization, at block 406, then a rendezvous time at which the stations (e.g., the sending station 110 and the receiving station 150 in FIG. 1) may wake up from power save mode may be established (e.g., by the power management module 136) at block 408. Processes associated with establishing the rendezvous time will be described in association with FIG. 5. If the probe response indicates that the station that received the association request does not support rendezvous synchronization, then processing may return to block 402, where an association request may be sent to one or more other stations to determine whether such stations support rendezvous synchronization.

At block 410, one or more data frames may be sent to the receiving device (e.g., by the communication module 134). If the transmission of the one or more data frames is not complete, then the one or more data frames may continue to be sent until a CF-end frame is sent, or the duration for of transmit opportunity (TXOP) is reached. If the transmission of the one or more data frames is complete, as determined at block 412, then a CF-end frame may be sent to the receiving device (e.g., by the communication module 134) at block 414. As described, the CF-end frame may function to terminate the duration for the transmit opportunity (TXOP). The sending station may enter power save mode (e.g., by the sleep module 136) at block 416. The receiving station may also enter power save mode.

If the rendezvous time established at block 408 has been reached at block 418, then the stations may wake up from power save mode (e.g., by the wake-up module 138) at block 420. If the established rendezvous time has not been reached, then the stations may remain in power save mode until such time is reached.

Figure 5:
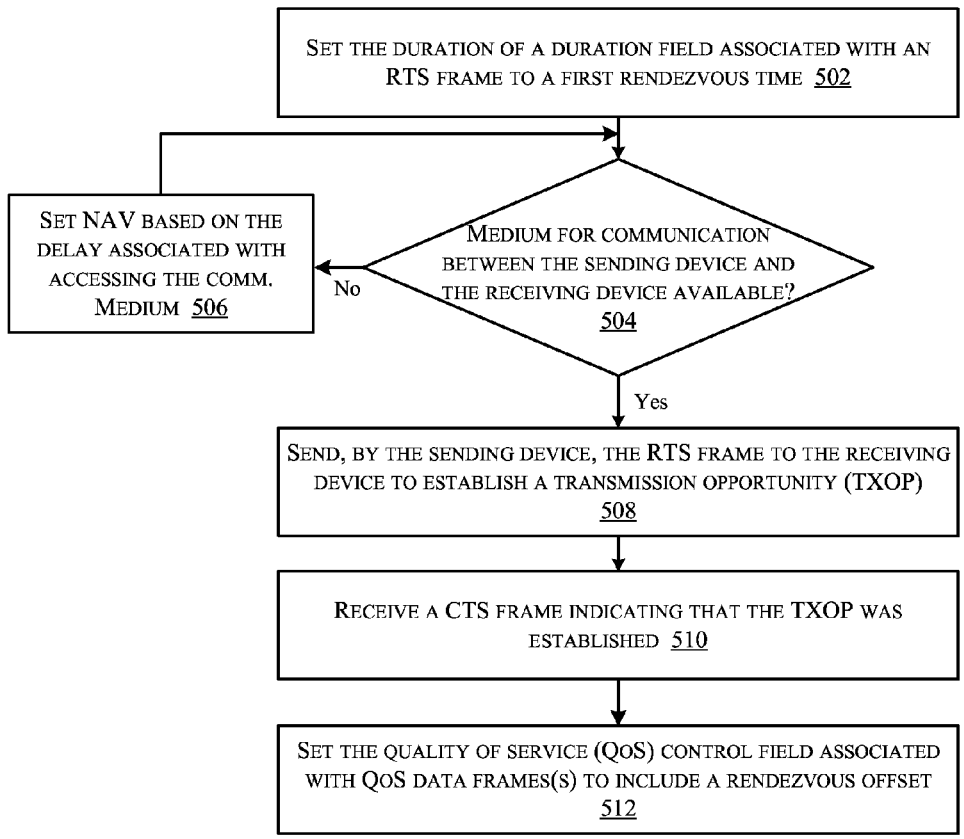
FIG. 5 illustrates a flow diagram of an example process for establishing a rendezvous time, according to an embodiment of the disclosure.

FIG. 5 depicts a flow diagram of an example process 406 for establishing a rendezvous time, according to an embodiment of the disclosure. In one embodiment, the example process 406 may be performed by the station 110 (or the station 150) in FIG. 1. The example process 406 may begin at block 502, where the duration of a duration field associated with an RTS frame may be set to a first rendezvous time at which the sending station (and the receiving station) is to awake from power save mode (e.g., by the power management module 136).

If a communication medium that may be used for communication between the sending station and the receiving station is available at block 504, then the sending device may send the RTS frame to the receiving station to establish a transmit opportunity (TXOP) at block 508. A CTS frame may be received in response to sending the RTS frame at block 510. In one embodiment, the CTS frame may also include a duration that is derived from the duration value of the RTS frame.

If the communication that may be used for communication between the sending station and the receiving station is not available at block 504, then the NAV associated with the sending station may be set based on a delay associated with accessing the communication medium at block 506. Processing may thereafter return to block 504 until the communication medium becomes available.

At block 512, the QoS control field associated with QoS data frames sent from the sending station to the receiving station may be set to include a rendezvous offset. Each of the QoS data frames may include the rendezvous offset (e.g., the same rendezvous offset), in one embodiment. The duration fields for each of the A-MPDUs transmitted from the sending device to the receiving device, however, may be different but may always contain the TxOP remainder.

Figure 6:
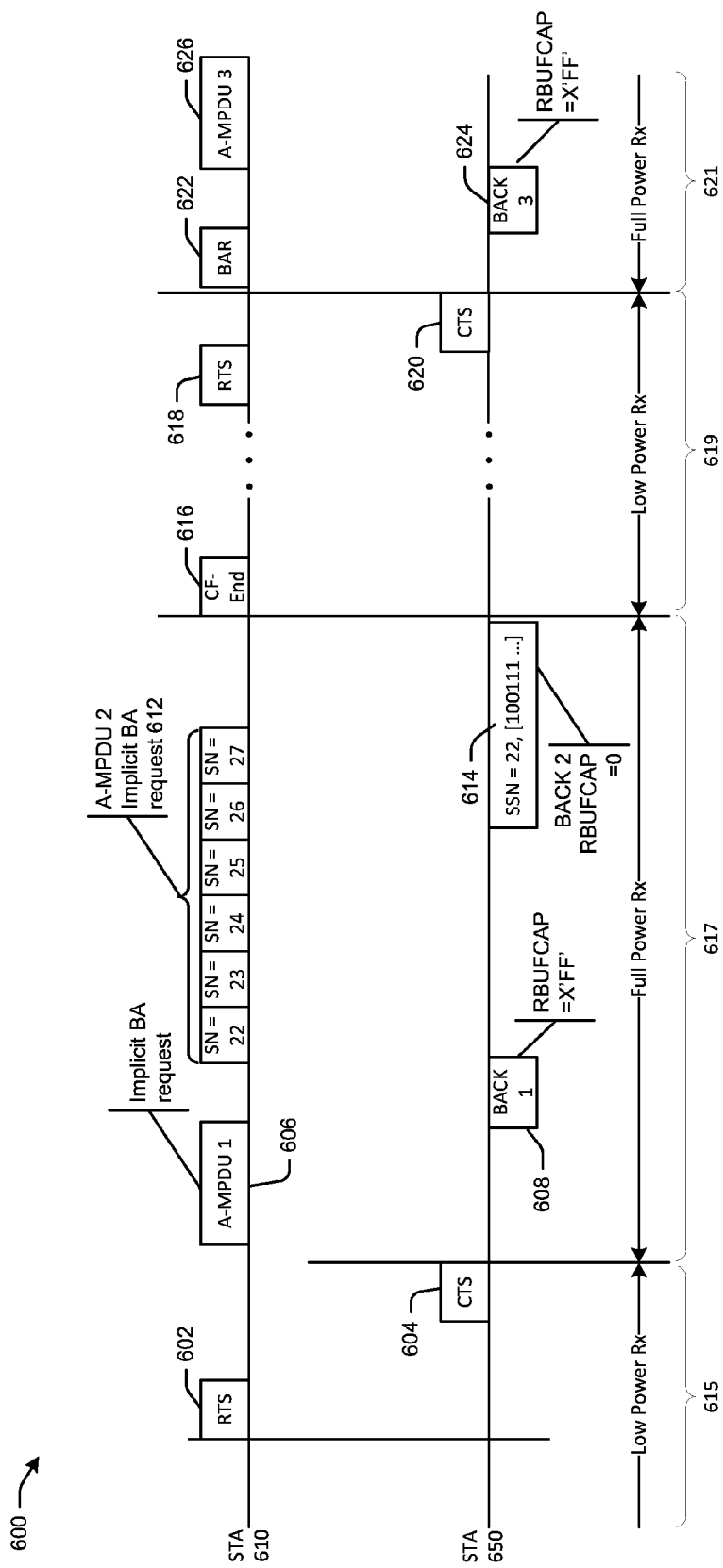
FIG. 6 illustrates a block diagram of an example technique for conserving power using an RBUFCAP field of an 802.11 frame, according to an embodiment of the disclosure.

FIG. 6 depicts a block diagram of an example technique 600 for conserving power using an RBUFCAP field of an 802.11 frame, according to an embodiment of the disclosure. The example technique 600 may be implemented by the station 110 in FIG. 1, in one embodiment. As used herein, the RBUFCAP may be defined in conjunction with DMG block ACK (BACK) with flow control. For example, the RBUFCAP field may include an unsigned integer that may be the number of MPDU buffers available to store received MPDUs at the time of transmission of an extended compressed BACK frame, for example, as defined by DMG BACK with flow control in the 802.11ad wireless standard.

In one configuration, the RBUFCAP field may include a BACK starting sequence control field that may include two (2) octets; a BACK bitmap field that may include eight (8) octets; and the RBUFCAP field, which may include one (1) octet. In certain embodiments herein, two values may be indicated in the RBUFCAP field to facilitate power conservation by wireless stations. Such values may not be related to DMG BACK with flow control feature support, in one embodiment.

Example values in the RBUFCAP field may include zero (0) and X'FF. A value of X'FF may indicate that there is no limitation on sending data frames, for example, after receiving the relevant BACK at the station sending the data frames. A value of zero (0) may indicate that no more Media Access Control Level Service Data Units (MSDUs) may be received by the receiving device. The receiving device, after receiving a certain amount of MSDUs, may send such an indication to the sending device to terminate sending of the MSDUs to the receiving device, as will be described in greater detail below.

Setting the RBUFCAP field with the values described above may be used to control power consumptions in communicating DMG stations in the embodiment in FIG. 6. Both stations 610 and 650 may begin in low power receive mode, as indicated by the lower power receive (Rx) indication 615. Low power receive, as used herein, may be consistent with using control PHY modulation with an omni-antenna mode since such a configuration may be limited to receive control frames and may consume substantially lower power than, for example, single carrier (SC) and orthogonal frequency division multiplexing (OFDM) modulation where multiple element phase arrays may be used to deliver data traffic. The power save mode described above for the stations 110, 150, 210, 250, 310, and 350 may also include such a low power receive mode.

The station 610 may send an RTS frame 602 to the station 650 to begin establishment of a transmit opportunity (TXOP). The station 650 may, in response to receiving the RTS frame 602, send a CTS frame 604 to the station 610, which may indicate that the transmit opportunity (TXOP) has been established. At such time, the stations 610 and 650 may enter full power receive mode, as indicated by the full power receive (Rx) indication 617.

Station 610 may send a first A-MPDU frame 606 to the station 650. A response to the A-MPDU frame 606 transmission may require an immediate response from the station 650, in one embodiment. Station 610 may respond to receipt of the first A-MPDU frame 606 with block acknowledgment (BACK) 608. In one embodiment, the BACK 608 may include a value of X'FF in the RBUFCAP field, which may indicate to the station 610 that it may continue sending data frames. The station 610 may thereafter send the A-MPDU data frames 612, which may include six (6) MPDUs with sequence numbers from 22 to 27 as shown. The station 650 may send a subsequent BACK 614, which may indicate that only a portion of the MPDUs (e.g., less than six) were received from the station 610. In one example, the BACK 614 may include a value of zero in the RBUFCAP field, which may indicate to the station 610 to stop sending MPDUs. Retransmission of the MPDUs that were not received by the station 610 (e.g., MPDUs 23 and 24) may also not be performed when the RBUFCAP field is set to zero (0). An indication of zero (0) in the RBUFCAP field may also indicate to the station 610 that the current transmit opportunity (TXOP) should be completed.

The station 610 may, in response to receiving the BACK 614 with an indication of zero (0) in the RBUFCAP field, send a CF-end frame 616 to the station 650 to truncate the transmit opportunity (TXOP). After such time, the stations 610 and 650 may reenter lower power receive mode, as indicated by the low power receive (Rx) indication 619.

The station 610 may send a block acknowledgement request (BAR) frame 622 to the station 650 to determine whether the station 650 may receive more data frames. The BAR frame 622 may be sent when the stations 610 and 650 have returned to full power receive mode, as indicated by the full power receive (Rx) indication 621. Prior to sending the BAR frame 622, the station 610 may send an RTS frame 618 and may receive a CTS frame 620 sent by STA 650 to establish a transmit opportunity (TXOP) during which the stations 610 and 650 may communicate with one another over a shared communication medium using EDCA channel access, in one embodiment. The station 650 may send a BACK 624, which may include a value of X'FF in the RBUFCAP field indicating that the station 610 may resume data frame transmission. The station 610 may thereafter send an A-MPDU 626, as well as one or more additional data frames as described above.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. For example, the techniques described herein are not limited to IEEE 802.11 networks. For example, these techniques may be employed in other networks including (but not limited to) IEEE 802.16 networks and IEEE 802.21 networks. Further, although specific terms are employed herein, they are used in a generic and descriptive sense only and not for purposes of limitation.

In an example embodiment, there is disclosed a device including: a modulator; a demodulator; and at least one processor, wherein the at least one processor is configured to: receive, from a sending device, a request a first control frame, to establish a transmit opportunity (TXOP) with the device, wherein a duration field associated with the first control frame comprises a rendezvous time at which the device and the sending device will wake up from respective power save modes; send a second control frame, the second control frame indicating to the sending device that a TXOP has been established; receive, from the sending device, one or more data frames; receive, from the sending device, a contention-free (CF)-end frame, wherein the CF-end frame terminates the TXOP; and in response to receiving the CF-end frame, enter power save mode until the rendezvous time is reached. The device may further include the at least one processor further configured to wake up from the power save mode when the rendezvous time is reached. The device may further include the at least one processor is further configured to: receive, from the sending device, an association request including a first indication about whether the sending device supports rendezvous synchronization; and send an association response to the sending device, wherein the association response comprises a second indication that the device supports rendezvous synchronization; wherein a respective capabilities element of the device and the sending device comprise the first indication and the second indication. The device may further include at least one radio and at least one memory. The device may further include at least one antenna.

In another example embodiment, there is disclosed a device. The device may include a modulator; a demodulator; and at least one processor, wherein the at least one processor is configured to: establish a transmit opportunity (TXOP) with a second device; send one or more data frames to the second device, wherein the one or more data frames comprise (i) a respective duration field including a duration of the TXOP remainder and (ii) a respective Quality of Service (QoS) control field, the respective QoS control field including a rendezvous offset; and determine a rendezvous time at which to wake up from power save mode based at least in part on the rendezvous time offset and the duration. The device may further include the at least one processor is further configured to send a contention-free (CF)-end frame to the second device, and in response to sending the CF-end frame, enter into power save mode. The device may further include the at least one processor is further configured to wake up from the power save mode when the rendezvous time is reached. The device may further include establishing the TXOP comprises the at least one processor being further configured to: send a request to send (RTS) frame; and in response to sending the RTS frame, receive a clear to send (CTS) frame. The device may further include the at least one processor is further configured to: send an association request to the second device, wherein the association request comprises a first indication that the device supports rendezvous synchronization; and receive, from the second device, an association response including a second indication whether the second device supports rendezvous synchronization; wherein a respective capabilities element of the device and the second device comprises the first indication and the second indication. The device may further include, wherein the association response comprises a constant, and wherein the at least one processor is further configured to determine a rendezvous time offset by multiplying the rendezvous offset by the constant. The device may further include the at least one processor is further configured to determine that the second device supports the rendezvous synchronization, wherein establishing the TXOP is in response to determining that the second device supports rendezvous synchronization. The device may further include at least one radio; and at least one memory. The device may further include at least one antenna.

In another example embodiment, there is disclosed a method. The method may include sending, by a first wireless device to a second wireless device, a first control frame to establish a transmit opportunity (TXOP) with the second wireless device, wherein a duration field associated with the first control frame comprises a rendezvous time at which the first wireless device and the second wireless device will wake up from respective power save modes; receiving, by the first wireless device, a second control frame from the second wireless device; sending, by the first wireless device to the second wireless device, a contention-free (CF)-end frame, the CF-end frame terminating the TXOP; and in response to sending the CF-end frame, entering, by the first wireless device, into the power save mode until the rendezvous time is reached. The method may further include sending, by the first wireless device, a third frame during the TXOP, wherein the third frame includes a duration field including the rendezvous time. The method may further include waking up, by the first wireless device, from the power save mode when the rendezvous time is reached. The method may further include sending, by the first wireless device, an association request to the second wireless device, wherein the association request comprises a first indication that the first wireless device supports rendezvous synchronization; and receiving, by the first wireless device from the second wireless device, an association response including a second indication whether the second wireless device supports rendezvous synchronization; wherein a respective capabilities element of the first wireless device comprises the first indication and the second indication. The method may further include establishing, by a first wireless device, a transmit opportunity (TXOP) with a second wireless device; sending, by the first wireless device, one or more data frames to the second wireless device, wherein the one or more data frames comprise (i) a respective duration field including a duration of the TXOP remainder and (ii) a respective Quality of Service (QoS) control field, the respective QoS control field including a rendezvous offset; and determining, by the first wireless device, a rendezvous time at which to wake up from power save mode based at least in part on the rendezvous time offset and the duration. The method may further include sending, by the first wireless, a contention-free (CF)-end frame to the second wireless device; and in response to sending the CF-end frame, entering, by the first wireless device, into power save mode. The method may further include waking up, by the first wireless device, from the power save mode when the rendezvous time is reached.

In another example embodiment, there is disclosed one or more computer-readable media storing computer-executable instructions. The one or more computer-readable media may store computer-executable instructions that, when executed by at least one processor, configure the at least one processor to perform operations which may include: sending one or more data frames to a wireless device; receiving, from the wireless device, a block acknowledgement (BACK) that at least a portion of the one or more data frames was received, wherein the BACK comprises a first indication in an RBUF-CAP field of the BACK, wherein the first indication causes the at least one processor to not send one or more subsequent data frames; and in response to receiving the BACK, entering into a low power receive mode, wherein the at least one processor is configured not to receive data frames during the low power receive mode. The at least one processor of the one or more computer-readable media, wherein the BACK comprises a first BACK, may execute the computer-executable instructions to perform the operations including sending a request to send (RTS) frame to wireless device to establish a transmit opportunity (TXOP) with the wireless device; receiving, from the wireless device, a clear to send (CTS) frame; sending, to the wireless device, a block acknowledgement request (BAR) to determine whether the wireless device is ready to receive the one or more subsequent frames; and receiving, from the wireless device, a second BACK including a second indication in the RBUFCAP field that causes the at least one processor to enter full power receive mode and send the one or more subsequent data frames. The at least one processor of the one or more computer-readable media may execute the computer-executable instructions to perform the operations including determining that the one or more subsequent data frames were not received by the wireless device, wherein sending the one or more subsequent data frames comprises a retransmission of the one or more subsequent data frames in response to the determination. The at least one processor of the one or more computer-readable media may execute the computer-executable instructions to perform the operations including in response to receiving the first indication, sending a contention-free (CF)-end frame to terminate the TXOP.

The at least one processor of the one or more computer-readable media may execute the computer-executable instructions to perform the operations including receiving, from a second device, a request a first control frame, to establish a transmit opportunity (TXOP) with the first device, wherein a duration field associated with the first control frame comprises a rendezvous time at which the first device and the second device will wake up from respective power save modes; sending a second control frame, the second control frame indicating to the second device that a TXOP has been established; receiving, from the second device, one or more data frames; receiving, from the second device, a contention-free (CF)-end frame, wherein the CF-end frame terminates the TXOP; and in response to receiving the CF-end frame, entering power save mode until the rendezvous time is reached. The at least one processor of the one or more computer-readable media may execute the computer-executable instructions to perform the operations including waking up from the power save mode when the rendezvous time is reached. The at least one processor of the one or more computer-readable media may execute the computer-executable instructions to perform the operations including receiving, from the second device, an association request including a first indication about whether the second device supports rendezvous synchronization; and sending an association response to the second device, wherein the association response comprises a second indication that the first device supports rendezvous synchronization; wherein a respective capabilities element of the first device and the second device comprise the first indication and the second indication.

The at least one processor of the one or more computer-readable media may execute the computer-executable instructions to perform the operations including establishing a transmit opportunity (TXOP) with a second device; sending one or more data frames to the second device, wherein the one or more data frames comprise (i) a respective duration field including a duration of the TXOP remainder and (ii) a respective Quality of Service (QoS) control field, the respective QoS control field including a rendezvous offset; and determining a rendezvous time at which to wake up from power save mode based at least in part on the rendezvous time offset and the duration. The at least one processor of the one or more computer-readable media may execute the computer-executable instructions to perform the operations including sending a contention-free (CF)-end frame to the second device; and in response to sending the CF-end frame, entering into power save mode.

The at least one processor of the one or more computer-readable media may execute the computer-executable instructions to perform the operations including waking up from the power save mode when the rendezvous time is reached. The at least one processor of the one or more computer-readable media may execute the computer-executable instructions to perform the operations including sending a request to send (RTS) frame; and in response to sending the RTS frame, receiving a clear to send (CTS) frame. The at least one processor of the one or more computer-readable media may execute the computer-executable instructions to perform the operations including sending an association request to the second device, wherein the association request comprises a first indication that the first device supports rendezvous synchronization; and receiving, from the second device, an association response including a second indication whether the second device supports rendezvous synchronization; wherein a respective capabilities element of the first device and the second device comprises the first indication and the second indication. The at least one processor of the one or more computer-readable media, wherein the association response comprises a constant, may execute the computer-executable instructions to perform the operations including determining a rendezvous time offset by multiplying the rendezvous offset by the constant. The at least one processor of the one or more computer-readable media may execute the computer-executable instructions to perform the operations including determining that the second device supports the rendezvous synchronization, wherein establishing the TXOP is in response to determining that the second device supports rendezvous synchronization.

In another example embodiment, there is disclosed a method. The method may include receiving, from a sending device, a request a first control frame, to establish a transmit opportunity (TXOP) with the device, wherein a duration field associated with the first control frame comprises a rendezvous time at which the device and the sending device will wake up from respective power save modes; sending a second control frame, the second control frame indicating to the sending device that a TXOP has been established; receiving, from the sending device, one or more data frames; receiving, from the sending device, a contention-free (CF)-end frame, wherein the CF-end frame terminates the TXOP; and in response to receiving the CF-end frame, entering power save mode until the rendezvous time is reached. The method may further include waking up from the power save mode when the rendezvous time is reached. The method may further include receiving, from the sending device, an association request including a first indication about whether the sending device supports rendezvous synchronization; and sending an association response to the sending device, wherein the association response comprises a second indication that the device supports rendezvous synchronization; wherein a respective capabilities element of the device and the sending device comprise the first indication and the second indication. The method may further include at least one radio; and at least one memory. The method may further include at least one antenna.

In another example embodiment, there is disclosed a system. The system may include at least one radio; at least one antenna; and at least one processor configured to access the at least one memory, wherein the at least one processor is configured to execute the computer-executable instructions to: receive, from a sending device, a request a first control frame, to establish a transmit opportunity (TXOP) with the device, wherein a duration field associated with the first control frame comprises a rendezvous time at which the device and the sending device will wake up from respective power save modes; send a second control frame, the second control frame indicating to the sending device that a TXOP has been established; receive, from the sending device, one or more data frames; receive, from the sending device, a contention-free (CF)-end frame, wherein the CF-end frame terminates the TXOP; and in response to receiving the CF-end frame, enter power save mode until the rendezvous time is reached. The system may further include the at least one processor further configured to execute the computer-executable instructions to wake up from the power save mode when the rendezvous time is reached. The system may further include the at least one processor further configured to execute the computer-executable instructions to: receive, from the sending device, an association request including a first indication about whether the sending device supports rendezvous synchronization; and send an association response to the sending device, wherein the association response comprises a second indication that the device supports rendezvous synchronization; wherein a respective capabilities element of the device and the sending device comprise the first indication and the second indication. The system may further include at least one radio; and at least one memory. The system may further include at least one antenna.

In another example embodiment, there is disclosed a device. The device may include a modulator; a demodulator; means for receiving, from a sending device, a request a first control frame, to establish a transmit opportunity (TXOP)

with the device, wherein a duration field associated with the first control frame comprises a rendezvous time at which the device and the sending device will wake up from respective power save modes; means for sending a second control frame, the second control frame indicating to the sending device that a TXOP has been established; means for receiving, from the sending device, one or more data frames; means for receiving, from the sending device, a contention-free (CF)-end frame, wherein the CF-end frame terminates the TXOP; and in response to receiving the CF-end frame, means for entering power save mode until the rendezvous time is reached. The device may further include means for waking up from the power save mode when the rendezvous time is reached. The device may further include means for receiving, from the sending device, an association request including a first indication about whether the sending device supports rendezvous synchronization; and means for sending an association response to the sending device, wherein the association response comprises a second indication that the device supports rendezvous synchronization; wherein a respective capabilities element of the device and the sending device comprise the first indication and the second indication. The device may further include at least one radio; and at least one memory. The device may further include at least one antenna.

In another example embodiment, there is disclosed a system. The system may include at least one radio; at least one antenna; and at least one processor configured to access the at least one memory, wherein the at least one processor is configured to execute the computer-executable instructions to: establish a transmit opportunity (TXOP) with a second device; send one or more data frames to the second device, wherein the one or more data frames comprise (i) a respective duration field including a duration of the TXOP remainder and (ii) a respective Quality of Service (QoS) control field, the respective QoS control field including a rendezvous offset; and determine a rendezvous time at which to wake up from power save mode based at least in part on the rendezvous time offset and the duration. The system may further include the at least one processor further configured to execute the computer-executable instructions to: send a contention-free (CF)-end frame to the second device; and in response to sending the CF-end frame, enter into power save mode. The system may further include the at least one processor further configured to execute the computer-executable instructions to wake up from the power save mode when the rendezvous time is reached. The system may further include establishing the TXOP comprises the at least one processor further configured to execute the computer-executable instructions to: send a request to send (RTS) frame; and in response to sending the RTS frame, receive a clear to send (CTS) frame. The system may further include the at least one processor further configured to execute the computer-executable instructions to: send an association request to the second device, wherein the association request comprises a first indication that the device supports rendezvous synchronization; and receive, from the second device, an association response including a second indication whether the second device supports rendezvous synchronization; wherein a respective capabilities element of the device and the second device comprises the first indication and the second indication. The system may further include the association response comprises a constant, and wherein the at least one processor further configured to execute the computer-executable instructions to determine a rendezvous time offset by multiplying the rendezvous offset by the constant. The system may further include the at least one processor further configured to execute the computer-executable instructions to determine that the second device supports the rendezvous synchronization, wherein establishing the TXOP is in response to determining that the second device supports rendezvous synchronization. The system may further include at least one radio; and at least one memory. The system may further include at least one antenna.

In another example embodiment, there is disclosed a device. The device may include a modulator; a demodulator; and means for establishing a transmit opportunity (TXOP) with a second device; means for sending one or more data frames to the second device, wherein the one or more data frames comprise (i) a respective duration field including a duration of the TXOP remainder and (ii) a respective Quality of Service (QoS) control field, the respective QoS control field including a rendezvous offset; and determining a rendezvous time at which to wake up from power save mode based at least in part on the rendezvous time offset and the duration. The device may further include means for sending a contention-free (CF)-end frame to the second device; and in response to sending the CF-end frame, means for entering into power save mode. The device may further include means for waking up from the power save mode when the rendezvous time is reached. The device may further include means for establishing the TXOP further including: means for sending a request to send (RTS) frame; and in response to sending the RTS frame, means for receiving a clear to send (CTS) frame. The device may further include means for sending an association request to the second device, wherein the association request comprises a first indication that the device supports rendezvous synchronization; and means for receiving, from the second device, an association response including a second indication whether the second device supports rendezvous synchronization; wherein a respective capabilities element of the device and the second device comprises the first indication and the second indication. The device may further include the association response comprises a constant, and further including means for determining a rendezvous time offset by multiplying the rendezvous offset by the constant. The device may further include means for determining that the second device supports the rendezvous synchronization, wherein establishing the TXOP is in response to means for determining that the second device supports rendezvous synchronization. The device may further include at least one radio; and at least one memory. The device may further include at least one antenna.

In another example embodiment, there is disclosed a system. The system may include at least one radio; at least one antenna; and at least one processor configured to access the at least one memory, wherein the at least one processor is configured to execute the computer-executable instructions to: send a first control frame to establish a transmit opportunity (TXOP) with the second wireless device, wherein a duration field associated with the first control frame comprises a rendezvous time at which the first wireless device and the second wireless device will wake up from respective power save modes; receive a second control frame from the second wireless device; send a contention-free (CF)-end frame, the CF-end frame terminating the TXOP; and in response to sending the CF-end frame, enter into the power save mode until the rendezvous time is reached. The system may further include send a third frame during the TXOP, wherein the third frame includes a duration field including the rendezvous time. The system may include the at least one processor further configured to execute the computer-executable instructions to wake up, by the first wireless device, from the power save mode when the rendezvous time is reached. The system may include the at least one processor further configured to execute the computer-executable instructions to: send an association request to the second wireless device, wherein the association request comprises a first indication that the first wireless device supports rendezvous synchronization; and receive an association response including a second indication whether the second wireless device supports rendezvous synchronization; wherein a respective capabilities element of the first wireless device comprises the first indication and the second indication.

In another example embodiment, there is disclosed an apparatus. The apparatus may include one or more radios; one or more antennas; means for sending, by a first wireless device to a second wireless device, a first control frame to establish a transmit opportunity (TXOP) with the second wireless device, wherein a duration field associated with the first control frame comprises a rendezvous time at which the first wireless device and the second wireless device will wake up from respective power save modes; means for receiving a second control frame from the second wireless device; means for sending a contention-free (CF)-end frame, the CF-end frame terminating the TXOP; and in response to sending the CF-end frame, means for entering into the power save mode until the rendezvous time is reached. The apparatus may further include means for sending a third frame during the TXOP, wherein the third frame includes a duration field including the rendezvous time. The apparatus may further include means for waking up, by the first wireless device, from the power save mode when the rendezvous time is reached. The apparatus may further include means for sending an association request to the second wireless device, wherein the association request comprises a first indication that the first wireless device supports rendezvous synchronization; and means for receiving an association response including a second indication whether the second wireless device supports rendezvous synchronization; wherein a respective capabilities element of the first wireless device comprises the first indication and the second indication.

In another example embodiment, there is disclosed a system. The system may include at least one radio; at least one antenna; and at least one processor configured to access the at least one memory, wherein the at least one processor is configured to execute the computer-executable instructions to: send one or more data frames to a wireless device; receive, from the wireless device, a block acknowledgement (BACK) that at least a portion of the one or more data frames was received, wherein the BACK comprises a first indication in an RBUFCAP field of the BACK, wherein the first indication causes the at least one processor to not send one or more subsequent data frames; and in response to receiving the BACK, enter into a low power receive mode, wherein the at least one processor is configured not to receive data frames during the low power receive mode. The system may further include, wherein the BACK comprises a first BACK, the at least one processor further configured to execute the computer-executable instructions to: send a request to send (RTS) frame to wireless device to establish a transmit opportunity (TXOP) with the wireless device; receive, from the wireless device, a clear to send (CTS) frame; send, to the wireless device, a block acknowledgement request (BAR) to determine whether the wireless device is ready to receive the one or more subsequent frames; and receive, from the wireless device, a second BACK including a second indication in the RBUFCAP field that causes the at least one processor to enter full power receive mode and send the one or more subsequent data frames. The system may further include the computer-executable instructions including sending the one or more data frames further comprises computer-executable instructions for sending the one or more subsequent data frames, wherein the at least one processor further configured to execute the computer-executable instructions to: determine that the one or more subsequent data frames were not received by the wireless device, wherein sending the one or more subsequent data frames comprises a retransmission of the one or more subsequent data frames in response to the determination. The system may further include the at least one processor further configured to execute the computer-executable instructions to in response to receiving the first indication, send a contention-free (CF)-end frame to terminate the TXOP.

In another example embodiment, there is disclosed an apparatus. The apparatus may include one or more radios; one or more antennas; means for sending one or more data frames to a wireless device; means for receiving, from the wireless device, a block acknowledgement (BACK) that at least a portion of the one or more data frames was received, wherein the BACK comprises a first indication in an RBUFCAP field of the BACK, wherein the first indication causes one or more subsequent data frames not to be sent; and in response to receiving the BACK, means for entering into a low power receive mode, wherein data frames are not received during the low power receive mode. The apparatus may further include, wherein the BACK comprises a first BACK, means for sending a request to send (RTS) frame to wireless device to establish a transmit opportunity (TXOP) with the wireless device; means for receiving, from the wireless device, a clear to send (CTS) frame; means for sending, to the wireless device, a block acknowledgement request (BAR) to determine whether the wireless device is ready to receive the one or more subsequent frames; and means for receiving, from the wireless device, a second BACK including a second indication in the RBUFCAP field that causes the at least one processor to enter full power receive mode and send the one or more subsequent data frames. The apparatus may further include means for determining that the one or more subsequent data frames were not received by the wireless device, wherein sending the one or more subsequent data frames comprises a retransmission of the one or more subsequent data frames in response to the determination. The apparatus may further include in response to receiving the first indication, means for sending a contention-free (CF)-end frame to terminate the TXOP.

In another example embodiment, there is disclosed a method. The method may include sending one or more data frames to a wireless device; receiving, from the wireless device, a block acknowledgement (BACK) that at least a portion of the one or more data frames was received, wherein the BACK comprises a first indication in an RBUFCAP field of the BACK, wherein the first indication causes the at least one processor to not send one or more subsequent data frames; and in response to receiving the BACK, entering into a low power receive mode, wherein the at least one processor is configured not to receive data frames during the low power receive mode. The method may further include, wherein the BACK comprises a first BACK, sending a request to send (RTS) frame to wireless device to establish a transmit opportunity (TXOP) with the wireless device; receiving, from the wireless device, a clear to send (CTS) frame; sending, to the wireless device, a block acknowledgement request (BAR) to determine whether the wireless device is ready to receive the one or more subsequent frames; and receiving, from the wireless device, a second BACK including a second indication in the RBUFCAP field that causes the at least one processor to enter full power receive mode and send the one or more subsequent data frames. The method may further include, determining that the one or more subsequent data frames were not received by the wireless device, wherein sending the one or more subsequent data frames comprises a retransmission of the one or more subsequent data frames in response to the determination. The method may further include, in response to receiving the first indication, sending a contention-free (CF)-end frame to terminate the TXOP.

What is claimed is:

1. A device comprising:
   a modulator;
   a demodulator; and
   at least one processor, wherein the at least one processor is configured to:
   receive, from a sending device, a request a first control frame, to establish a transmit opportunity (TXOP) with the device, wherein a duration field associated with the first control frame comprises a rendezvous time at which the device and the sending device will wake up from respective power save modes;
   send a second control frame, the second control frame indicating to the sending device that a TXOP has been established;
   receive, from the sending device, one or more data frames;
   receive, from the sending device, a contention-free (CF)-end frame, wherein the CF-end frame terminates the TXOP; and
   in response to receiving the CF-end frame, enter power save mode until the rendezvous time is reached.

2. The device of claim 1, wherein the at least one processor is further configured to:
   wake up from the power save mode when the rendezvous time is reached.

3. The device of claim 1, wherein the at least one processor is further configured to:
   receive, from the sending device, an association request comprising a first indication about whether the sending device supports rendezvous synchronization; and
   send an association response to the sending device, wherein the association response comprises a second indication that the device supports rendezvous synchronization;
   wherein a respective capabilities element of the device and the sending device comprise the first indication and the second indication.

4. The device of claim 1, further comprising:
   at least one radio; and
   at least one memory.

5. The device of claim 4, further comprising at least one antenna.

6. A device comprising:
   a modulator;
   a demodulator; and
   at least one processor, wherein the at least one processor is configured to:
   establish a transmit opportunity (TXOP) with a second device;
   send one or more data frames to the second device, wherein the one or more data frames comprise (i) a respective duration field comprising a duration of the TXOP remainder and (ii) a respective Quality of Service (QoS) control field, the respective QoS control field comprising a rendezvous offset; and
   determine a rendezvous time at which to wake up from power save mode based at least in part on the rendezvous time offset and the duration.

7. The device of claim 6, wherein the at least one processor is further configured to:
   send a contention-free (CF)-end frame to the second device; and
   in response to sending the CF-end frame, enter into power save mode.

8. The device of claim 6, wherein the at least one processor is further configured to:
   wake up from the power save mode when the rendezvous time is reached.

9. The device of claim 6, wherein establishing the TXOP comprises the at least one processor being further configured to:
   send a request to send (RTS) frame; and
   in response to sending the RTS frame, receive a clear to send (CTS) frame.

10. The device of claim 6, wherein the at least one processor is further configured to:
    send an association request to the second device, wherein the association request comprises a first indication that the device supports rendezvous synchronization; and
    receive, from the second device, an association response comprising a second indication whether the second device supports rendezvous synchronization;
    wherein a respective capabilities element of the device and the second device comprises the first indication and the second indication.

11. The device of claim 6, wherein the association response comprises a constant, and wherein the at least one processor is further configured to determine a rendezvous time offset by multiplying the rendezvous offset by the constant.

12. The device of claim 11, wherein the at least one processor is further configured to:
    determine that the second device supports the rendezvous synchronization, wherein establishing the TXOP is in response to determining that the second device supports rendezvous synchronization.

13. The device of claim 6, further comprising:
    at least one radio; and
    at least one memory.

14. The device of claim 13, further comprising at least one antenna.

15. A method comprising:
    sending, by a first wireless device to a second wireless device, a first control frame to establish a transmit opportunity (TXOP) with the second wireless device, wherein a duration field associated with the first control frame comprises a rendezvous time at which the first wireless device and the second wireless device will wake up from respective power save modes;
    receiving, by the first wireless device, a second control frame from the second wireless device;
    sending, by the first wireless device to the second wireless device, a contention-free (CF)-end frame, the CF-end frame terminating the TXOP; and
    in response to sending the CF-end frame, entering, by the first wireless device, into the power save mode until the rendezvous time is reached.

16. The method of claim 15, further comprising sending, by the first wireless device, a third frame during the TXOP, wherein the third frame includes a duration field comprising the rendezvous time.

17. The method of claim 15, further comprising:
    waking up, by the first wireless device, from the power save mode when the rendezvous time is reached.

18. The method of claim 15, further comprising:
    sending, by the first wireless device, an association request to the second wireless device, wherein the association request comprises a first indication that the first wireless device supports rendezvous synchronization; and
receiving, by the first wireless device from the second wireless device, an association response comprising a second indication whether the second wireless device supports rendezvous synchronization;
wherein a respective capabilities element of the first wireless device comprises the first indication and the second indication.

19. A method comprising:
establishing, by a first wireless device, a transmit opportunity (TXOP) with a second wireless device;
sending, by the first wireless device, one or more data frames to the second wireless device, wherein the one or more data frames comprise (i) a respective duration field comprising a duration of the TXOP remainder and (ii) a respective Quality of Service (QoS) control field, the respective QoS control field comprising a rendezvous offset; and
determining, by the first wireless device, a rendezvous time at which to wake up from power save mode based at least in part on the rendezvous time offset and the duration.

20. The method of claim 19, further comprising:
sending, by the first wireless, a contention-free (CF)-end frame to the second wireless device; and
in response to sending the CF-end frame, entering, by the first wireless device, into power save mode.

21. The method of claim 20, further comprising:
waking up, by the first wireless device, from the power save mode when the rendezvous time is reached.

22. One or more non-transitory computer-readable media storing computer-executable instructions that, when executed by at least one processor, configure the at least one processor to perform operations comprising:
sending one or more data frames to a wireless device;
receiving, from the wireless device, a block acknowledgement (BACK) that at least a portion of the one or more data frames was received, wherein the BACK comprises a first indication in an RBUFCAP field of the BACK, wherein the first indication causes the at least one processor to not send one or more subsequent data frames; and
in response to receiving the BACK, entering into a low power receive mode, wherein the at least one processor is configured not to receive data frames during the low power receive mode.

23. The one or more non-transitory computer-readable media of claim 22, wherein the BACK comprises a first BACK, and wherein the at least one processor is further configured to execute the computer-executable instructions to perform the operations comprising:
sending a request to send (RTS) frame to wireless device to establish a transmit opportunity (TXOP) with the wireless device;
receiving, from the wireless device, a clear to send (CTS) frame;
sending, to the wireless device, a block acknowledgement request (BAR) to determine whether the wireless device is ready to receive the one or more subsequent frames; and
receiving, from the wireless device, a second BACK comprising a second indication in the RBUFCAP field that causes the at least one processor to enter full power receive mode and send the one or more subsequent data frames.

24. The one or more non-transitory computer-readable media of claim 22, wherein the computer-executable instructions comprising sending the one or more data frames further comprises computer-executable instructions for sending the one or more subsequent data frames, wherein the at least one processor is further configured to execute the computer-executable instructions to perform the operations comprising:
determining that the one or more subsequent data frames were not received by the wireless device, wherein sending the one or more subsequent data frames comprises a retransmission of the one or more subsequent data frames in response to the determination.

25. The one or more non-transitory computer-readable media of claim 22, wherein the at least one processor is further configured to execute the computer-executable instructions to perform the operations comprising:
in response to receiving the first indication, sending a contention-free (CF)-end frame to terminate the TXOP.

26. One or more non-transitory computer-readable media storing computer-executable instructions that, when executed by at least one processor associated with a first device, configure the at least one processor to perform operations comprising:
receiving, from a second device, a request a first control frame, to establish a transmit opportunity (TXOP) with the first device, wherein a duration field associated with the first control frame comprises a rendezvous time at which the first device and the second device will wake up from respective power save modes;
sending a second control frame, the second control frame indicating to the second device that a TXOP has been established;
receiving, from the second device, one or more data frames;
receiving, from the second device, a contention-free (CF)-end frame, wherein the CF-end frame terminates the TXOP; and
in response to receiving the CF-end frame, entering power save mode until the rendezvous time is reached.

27. The one or more computer-readable media of claim 26, wherein the at least one processor is further configured to execute the computer-executable instructions to perform the operation comprising:
waking up from the power save mode when the rendezvous time is reached.

28. The one or more computer-readable media of claim 26, wherein the at least one processor is further configured to execute the computer-executable instructions to perform the operation comprising:
receiving, from the second device, an association request comprising a first indication about whether the second device supports rendezvous synchronization; and
sending an association response to the second device, wherein the association response comprises a second indication that the first device supports rendezvous synchronization;
wherein a respective capabilities element of the first device and the second device comprise the first indication and the second indication.

29. One or more non-transitory computer-readable media storing computer-executable instructions that, when executed by at least one processor associated with a first device, configure the at least one processor to perform operations comprising:
establishing a transmit opportunity (TXOP) with a second device;
sending one or more data frames to the second device, wherein the one or more data frames comprise (i) a respective duration field comprising a duration of the TXOP remainder and (ii) a respective Quality of Service (QoS) control field, the respective QoS control field comprising a rendezvous offset; and determining a rendezvous time at which to wake up from power save mode based at least in part on the rendezvous time offset and the duration.

30. The one or more computer-readable media of claim 29, wherein the at least one processor is further configured to execute the computer-executable instructions to perform the operation comprising:

sending a contention-free (CF)-end frame to the second device; and in response to sending the CF-end frame, entering into power save mode.

31. The one or more computer-readable media of claim 29, wherein the at least one processor is further configured to execute the computer-executable instructions to perform the operation comprising:

waking up from the power save mode when the rendezvous time is reached.

32. The one or more computer-readable media of claim 29, wherein establishing the TXOP comprises the at least one processor being further configured to execute the computer-executable instructions to perform the operations comprising:

sending a request to send (RTS) frame; and in response to sending the RTS frame, receiving a clear to send (CTS) frame.

33. The one or more computer-readable media of claim 29, wherein the at least one processor is further configured to execute the computer-executable instructions to perform the operation comprising:

sending an association request to the second device, wherein the association request comprises a first indication that the first device supports rendezvous synchronization; and receiving, from the second device, an association response comprising a second indication whether the second device supports rendezvous synchronization;

wherein a respective capabilities element of the first device and the second device comprises the first indication and the second indication.

34. The one or more computer-readable media of claim 29, wherein the association response comprises a constant, and wherein the at least one processor is further configured to execute the computer-executable instructions to perform the operation comprising determining a rendezvous time offset by multiplying the rendezvous offset by the constant.

35. The one or more computer-readable media of claim 34, wherein the at least one processor is further configured to execute the computer-executable instructions to perform the operation comprising:

determining that the second device supports the rendezvous synchronization, wherein establishing the TXOP is in response to determining that the second device supports rendezvous synchronization.

* * * * *